(12) United States Patent
Kang et al.

(10) Patent No.: US 8,772,799 B2
(45) Date of Patent: Jul. 8, 2014

(54) DISPLAY SUBSTRATE AND METHOD FOR MANUFACTURING THE SAME

(75) Inventors: Dong-Uk Kang, Suwon-si (KR); Chul Huh, Yongin-si (KR); Sang-Hun Lee, Suwon-si (KR); Gwan-Soo Kim, Asan-si (KR)

(73) Assignee: Samsung Display Co., Ltd. (KR)

( * ) Notice: Subject to any disclaimer, the term of this patent is extended or adjusted under 35 U.S.C. 154(b) by 191 days.

(21) Appl. No.: 13/406,811

(22) Filed: Feb. 28, 2012

(65) Prior Publication Data

US 2013/0009176 A1    Jan. 10, 2013

(30) Foreign Application Priority Data

Jul. 8, 2011 (KR) .................. 10-2011-0067929

(51) Int. Cl.
*H01L 33/08* (2010.01)
(52) U.S. Cl.
USPC ............... 257/91; 257/72; 257/88; 257/93; 257/98; 257/E33.053
(58) Field of Classification Search
USPC ............. 257/72, 88, 91, 93, 98, E33.053
See application file for complete search history.

(56) References Cited

U.S. PATENT DOCUMENTS

2009/0027607 A1    1/2009  Kim et al.
2010/0065850 A1*   3/2010  Kwak et al. .............. 257/72

FOREIGN PATENT DOCUMENTS

JP      4506231 A       5/2010
KR      0252650 A       1/2000
KR      1020050064272 A 6/2005

* cited by examiner

*Primary Examiner* — Minchul Yang
(74) *Attorney, Agent, or Firm* — Cantor Colburn LLP

(57) ABSTRACT

A display substrate includes a base substrate, color filter layers, a bottom supporting layer and a light-blocking and maintaining element. The base substrate includes a gate line, a data line crossing the gate line, and a switching element on the base substrate. The color filter layers are adjacent to each other on the base substrate. The bottom supporting layer is between the color filter layers adjacent to each other and on the base substrate. The light-blocking and maintaining element is between the color filter layers adjacent to each other, and on the bottom supporting layer. The light-blocking and maintaining element includes a light blocking portion, and a maintaining portion which overlaps the bottom supporting layer and protrudes from the light blocking portion.

10 Claims, 7 Drawing Sheets

DISPLAY SUBSTRATE AND METHOD FOR MANUFACTURING THE SAME

CROSS REFERENCE TO RELATED APPLICATION

This application claims priority to Korean Patent Application No. 2011-0067929, filed on Jul. 8, 2011, and all the benefits accruing therefrom under 35 U.S.C. §119, the contents of which are herein incorporated by reference in their entireties.

BACKGROUND OF THE INVENTION

1. Field of the Invention

Example embodiments of the invention relate to a display substrate and a method for manufacturing the display substrate. More particularly, example embodiments of the invention relate to a display substrate used for a display apparatus, and a method for manufacturing the display substrate.

2. Description of the Related Art

In general, a liquid crystal display ("LCD") apparatus includes an array substrate, an opposing substrate facing the array substrate, and a liquid crystal layer disposed between the array substrate and the opposing substrate. A high transmissive LCD apparatus having a color-filter on array ("COA") substrate in which a color filter is formed on an array substrate has been developed. A black matrix on Array ("BOA") substrate in which a light blocking element is formed on the COA substrate has been developed to prevent the COA substrate and the opposing substrate having the light blocking element from being misaligned with each other when combined with each other, and a black column spacer ("BCS") in which a light blocking pattern and a maintaining element maintaining a gap between the light blocking pattern and the substrate include substantially same material, has been developed.

The BCS includes a light blocking portion and a maintaining portion. The BCS has an advantage in a smear margin which means an amount of restoration of the substrate from a pressed state to an initial state, so that the BCS has a high definition. Accordingly, a taper angle which is an angle between the light blocking portion and the maintaining portion should be increased to have the higher definition. The taper angle may be controlled by changing a ratio of elements of the BCS substrate. In general, the BCS substrate includes a polymer and a monomer. The BCS substrate has the higher definition, as a portion of the polymer is decreased with respect to the portion of the monomer. However, an upper portion of the maintaining portion of the BCS substrate may be more recessed during a baking process in manufacturing the BCS substrate, as the portion of the polymer is decreased.

Since the maintaining portion supports an upper substrate and a bottom substrate, a cell gap may not be uniform and a blur may occur on a screen if the upper portion of the maintaining portion of the BCS substrate is recessed.

BRIEF SUMMARY OF THE INVENTION

Example embodiments of the invention provide a display substrate capable of uniformly maintaining a cell gap of a liquid crystal cell.

Example embodiments of the invention also provide a method of manufacturing the display substrate.

According to an example embodiment, a display substrate includes a base substrate, color filter layers, a bottom supporting layer and light-blocking and maintaining element (BCS). The base substrate includes a gate line, a data line crossing the gate line, a switching element disposed on the base substrate. The color filter layers are disposed adjacent to each other on the base substrate. The bottom supporting layer is disposed between the color filter layers adjacent to each other and disposed on the base substrate. The BCS is disposed between the color filter layers adjacent to each other and disposed on the bottom supporting layer, and includes light blocking portion, and a maintaining portion overlapping with the bottom supporting layer and protruding from the light blocking portion.

In an example embodiment, the display substrate may further include an inorganic insulating layer disposed over the color filter layer, and a pixel electrode disposed over the inorganic insulating layer. A height of the light blocking portion from the base substrate may be substantially the same as the height of the pixel electrode from the base substrate.

In an example embodiment, a width of a cross-section of the maintaining portion taken substantially parallel with the base substrate may decrease in a direction away from the base substrate.

In an example embodiment, a width of a cross-section of the bottom supporting layer taken substantially parallel with the base substrate may decrease in a direction away from the base substrate.

In an example embodiment, a minimum width of the cross-section of the maintaining portion taken substantially parallel with the base substrate may be larger than a maximum width of the cross-section of the bottom supporting layer taken substantially parallel with the base substrate.

In an example embodiment, the minimum width of the cross-section of the maintaining portion may be about 35 micrometers (μm) and the maximum width of the cross-section of the bottom supporting layer may be between about 10 μm and about 15 μm.

In an example embodiment, an angle between a side surface of the maintaining portion and an upper surface of the light blocking portion may be about 40°.

In an example embodiment, the color filter layer and the bottom supporting layer may be in substantially the same layer, and the color filter layer and the bottom supporting layer may have substantially the same thickness.

In an example embodiment, the display substrate may further include an inorganic insulating layer which overlaps the bottom supporting layer and the color filter layer.

In an example embodiment, the display substrate may further include an organic insulating layer disposed between the inorganic insulating layer and the BCS. An upper surface of the organic insulating layer overlapping the bottom supporting layer may be higher than an upper surface of the protecting layer not overlapping the bottom supporting layer. In a method for manufacturing a display substrate according to an example embodiment, a gate line, a data line crossing the gate line and a switching element are formed on a base substrate. A first photo sensitive layer is deposited over the base substrate. The first photo sensitive layer is patterned to form color filter layers adjacent to each other, and a bottom supporting layer between color filter layers adjacent to each other, on the base substrate. The BCS including a light blocking portion and a maintaining portion is formed on the base substrate, and the maintaining portion overlaps with the bottom supporting layer and protrudes from the light blocking portion.

In an example embodiment, forming the color filter layers and the bottom supporting layer may include disposing a photo mask including first, second and third light transmitting portions over the first photo sensitive layer, removing the first photo sensitive layer except for a portion of the first photo sensitive layer corresponding to the first, second and third light transmitting portions, baking the first photo sensitive layer corresponding to the second light transmitting portion to form the bottom supporting layer, and forming the color filter layers using the first photo sensitive layer corresponding to the first and third light transmitting portions.

In an example embodiment, forming the BCS may include depositing a second photo sensitive layer over the base substrate and the bottom supporting layer, disposing a half tone mask including a first light exposing area and a second light exposing area over the second photo sensitive layer, exposing and developing the second photo sensitive layer to remove the photo sensitive layer except for a portion of the photo sensitive layer corresponding to the first and second exposing areas, and baking the remaining second photo sensitive layer, corresponding to the first exposing area to form the maintaining portion and corresponding to the second exposing area to form the light blocking portion. A light transmittance of the second light exposing area is higher than that of the first light exposing area.

In an example embodiment, the second photo sensitive layer may include a polymer and a monomer in the ratio of about 4:5.

In an example embodiment, the method may further include forming an inorganic insulating layer on the base substrate, the bottom supporting layer and the color filter layer, before forming the BCS.

In an example embodiment, a width of the second light transmitting portion may be between about 10 μm and about 15 μm, and a width of the first light transmitting portion may be about 35 μm.

In an example embodiment, a height of the organic insulating layer formed on the bottom supporting layer may be larger than that of the organic insulating layer formed in an area except for the bottom supporting layer.

According to example embodiments, a BCS substrate has a high taper angle and recessing of a maintaining portion of the BCS substrate may be reduced or effectively prevented.

In addition, since a bottom supporting layer as well as a color filter is formed at the same time, a manufacturing process is simplified and an additional material is unnecessary.

BRIEF DESCRIPTION OF THE DRAWINGS

The above and other features of the invention will become more apparent by describing in detailed example embodiments thereof with reference to the accompanying drawings, in which.

DETAILED DESCRIPTION OF THE INVENTION

Figure 1:
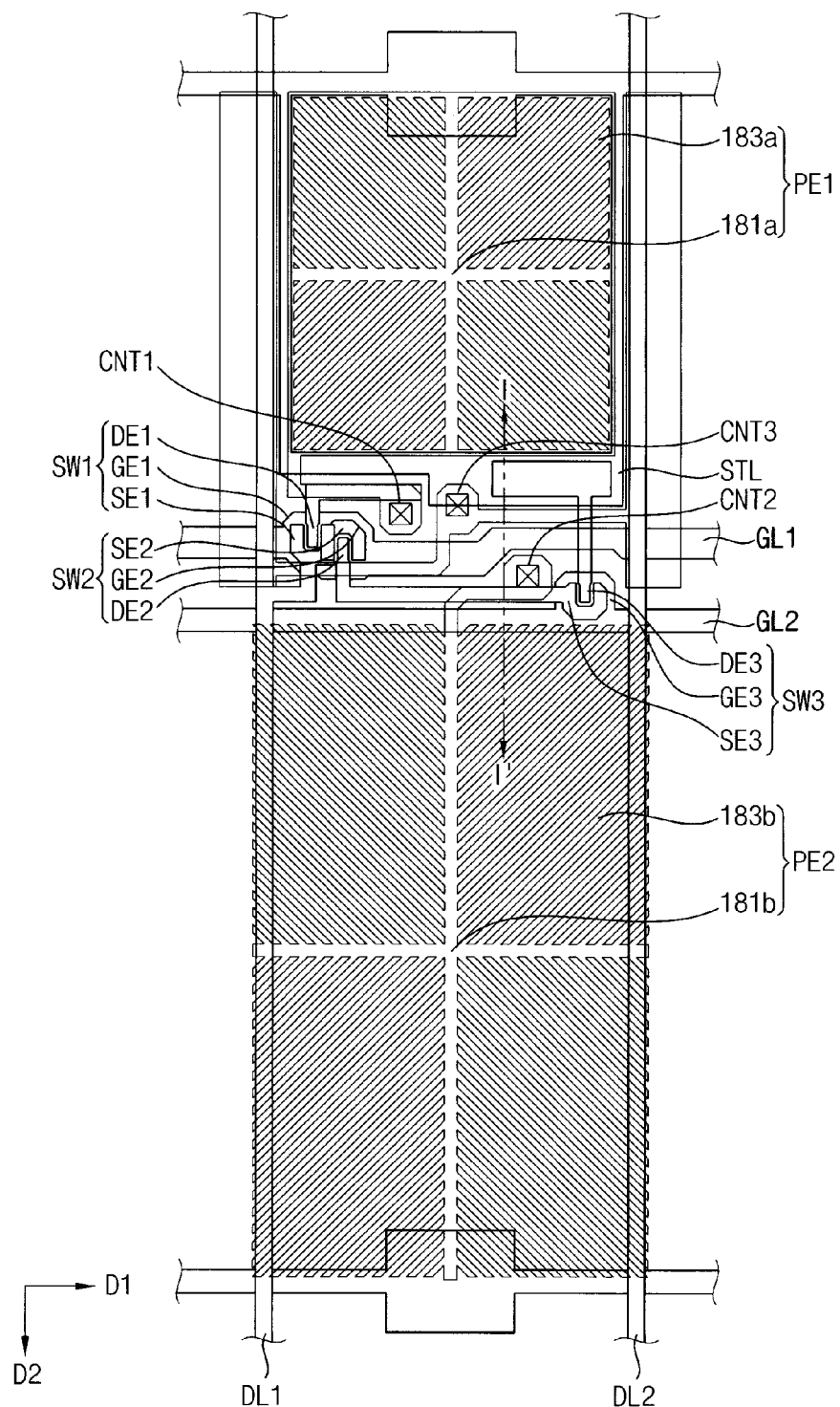
FIG. 1 is a plan view illustrating an example embodiment of a display apparatus according to the invention.

The invention is described more fully hereinafter with reference to the accompanying drawings, in which example embodiments of the invention are shown. This invention may, however, be embodied in many different forms and should not be construed as limited to the example embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

Hereinafter, example embodiments of the invention will be explained in detail with reference to the accompanying drawings.

Figure 2:
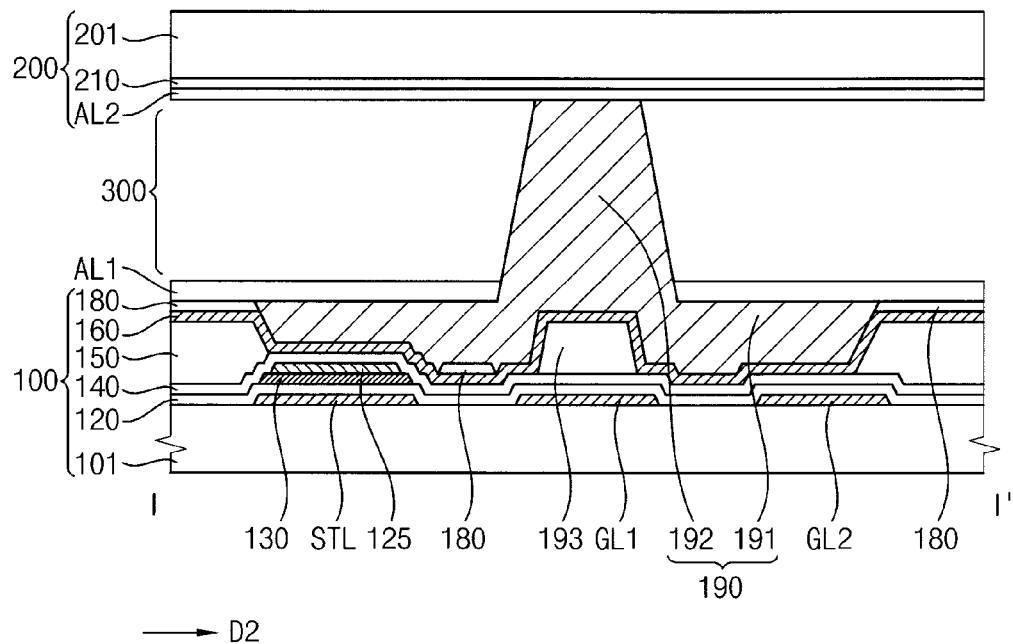
FIG. 2 is a cross-sectional view taken along line I-I' of FIG. 1.

FIG. 1 is a plan view illustrating an example embodiment of a display apparatus according to the invention. FIG. 2 is a cross-sectional view taken along line I-I' of FIG. 1. Referring to FIGS. 1 and 2, the example embodiment of a display apparatus according to the invention includes a first substrate 100, a second substrate 200 and a liquid crystal layer 300.

The first substrate 100 includes a gate line GLn, a data line DLm, a storage line STL, switching element SW1, SW2 and SW3, a gate insulating layer 120, an active layer 130, a passivation layer 140, a color filter layer 150, an inorganic insulating layer 160, a pixel electrode 180, a light-blocking and maintaining element ("BCS") 190 and a bottom supporting layer 193, which are on a first base substrate 101.

A first gate line GL1 and a second gate line GL2 longitudinally extend along a first direction D1, and the second gate line GL2 is disposed adjacent to the first gate line GL1. A first data line DL1 and a second data line DL2 longitudinally extend along a second direction D2 crossing the first direction D1, and the second data line DL2 is disposed adjacent to the first data line DL1.

The first switching element SW1 is disposed in an area in which the first gate line GL1 and the first data line DL1 cross each other. The first switching element SW1 is disposed in a boundary area between first and second sub pixel areas. In the first switching element SW1, a first gate electrode GE1 is electrically connected to the first gate line GL1, a first source electrode SE1 is electrically connected to the first data line DL1, and a first sub pixel electrode PE1 is electrically connected to a first drain electrode DE1 through a first contact hole CNT1. The first sub pixel electrode PE1 is disposed in the first sub pixel area of the pixel area, adjacent to the second sub pixel area.

The second switching element SW2 is disposed adjacent to the area in which the first gate line GL1 and the first data line DL1 cross each other. The second switching element SW2 is disposed in the boundary area between the first and second sub pixel areas. In the second switching element SW2, a second gate electrode GE2 is electrically connected to the first gate line GL1, a second source electrode SE2 is electrically connected to the first data line DL1 and the first source electrode SE1, and a second sub pixel electrode PE2 is electrically connected to a second drain electrode DE2 through a second contact hole CNT2. The second sub pixel electrode PE2 is disposed in the second sub pixel area of the pixel area adjacent to the first sub pixel area.

The third switching element SW3 is disposed adjacent to an area in which the second gate line GL2 and the second data line DL2 cross each other. The third switching element SW3 is disposed in the boundary area between the first and second sub pixel areas. In the third switching element SW3, a third gate electrode GE3 is electrically connected to the second gate line GL2, a third source electrode SE3 is electrically connected to the first data line DL1 and the second drain electrode DE2, and a third drain electrode DE3 is electrically connected to the storage line STL.

The storage line STL partially overlaps with the first sub pixel electrode PE1, so that the storage line STL is disposed to surround the first sub pixel area. The gate insulating layer 120 and the passivation layer 140 are disposed between the first sub pixel electrode PE1 and the storage line STL.

The third drain electrode DE3 of the third switching element SW3 is electrically connected to a first electrode 125 of a down capacitor Cdown, and the first electrode 125 overlaps with the storage line STL. The storage line STL may be defined as a second electrode of the down capacitor Cdown.

The first and second switching elements SW1 and SW2 are turned on in response to a first gate signal applied to the first gate line GL1, and the third switching element SW3 is turned on in response to a second gate signal applied to the second gate line GL2. Thus, the down capacitor Cdown decreases a data voltage charged by the second sub pixel electrode PE2, when the third switching element SW3 is turned on. An area including the first sub pixel electrode PE1 may be defined as a high pixel HP of the display apparatus, and an area including the second sub pixel electrode PE2 may be defined as a low pixel LP.

The first sub pixel electrode PE1 includes a first micro electrode 183a, and may spread out like the spokes of a wheel from a cross-shaped first body portion 181a longitudinally extending along the first and second directions D1 and D2. The second sub pixel electrode PE2 includes a second micro electrode 183b, and may spread out like the spokes of a wheel from a cross-shaped second body portion 181b longitudinally extending along the first and second directions D1 and D2.

The gate insulating layer 120 is on the first base substrate 101 including a gate pattern including the first and second gate lines GL1 and GL2 and the first, second and third gate electrodes GE1, GE2 and GE3. The gate insulating layer 120 covers the gate pattern and the storage line STL.

The active layer 130 is on the gate insulating layer 120 and is an electrical path of a switching element SW. In one embodiment, for example, the active layer 130 may include a stacked structure including a semiconductor layer including amorphous silicon (s-Si:H) and an ohmic contact layer including amorphous silicon doped with an ion (n+s-Si:H).

A source pattern including first and second data lines DL1 and DL2 and first, second and third source electrodes SE1, SE2 and SE3, and first, second and third drain electrodes DE1, DE2 and DE3, is on the first base substrate 101 including the active layer 130. The passivation layer 140 is on the first base substrate 101 including the source pattern.

The color filter layer 150 and the bottom supporting layer 193 are on the first base substrate 101 including the passivation layer 140. In one example embodiment, the color filter layer 150 may be in first and second sub pixel areas defined by the first and second gate lines GL1 and GL2 and the first and second data lines DL1 and DL2. The color filter layer 150 may include a stacked structure including first, second and third color filter layers (not shown). The first, second and third color filter layers have colors different from each other. The bottom supporting layer 193 may be disposed between two color filter layers adjacent to each other of the first, second and third color filter layers, and may be disposed at a substantially same layer as a layer of the color filter layer 150.

The inorganic insulating layer 160 is on the first base substrate 100 including the color filter layer 150. In one example embodiment, for example, the inorganic insulating layer 160 may include a silicon nitride (SiNx).

The BCS 190 is in a boundary area of each pixel area, and in a boundary area of each of the first and second sub pixel areas including the first and second sub pixel electrodes PE1 and PE2 respectively on the first base substrate 101. The BCS 190 is disposed between the color filter layers adjacent to each other.

The BCS 190 includes a light blocking portion 191 blocking the light provided from a bottom portion of the first substrate 100 to prevent the light from being provided to the liquid crystal layer 300, and a maintaining portion 192 maintaining a gap between the first and second substrates 100 and 200. The light blocking portion 191 and the maintaining portion 192 are a single, unitary, indivisible member. According to the illustrated example embodiment, both sides of the maintaining portion 192 in cross-sectional view thereof are inclined with respect to the first base substrate 101 to form a trapezoid shape as shown in FIG. 2, but the shape of the maintaining portion 192 is not limited thereto. In one example embodiment, for example, a cross-sectional view of the maintaining portion 192 may have various shapes such as a circle, a quadrangle, a hexagon, and a polygon, and so on.

The bottom supporting layer 193 is under the BCS 190. In one example embodiment, for example, the bottom supporting layer 193 is disposed under the maintaining portion 192 so that the bottom supporting layer 193 and the maintaining portion 192 overlap with each other in a plan view, and the bottom supporting layer 193 supports the maintaining portion 192. Accordingly, the bottom supporting layer 193 may reduce or effectively prevent the maintaining portion 192 from being recessed during a baking process in manufacturing the maintaining portion 192. The BCS 190 and the bottom supporting layer 193 will be explained below in detail with reference to FIG. 3.

The second substrate 200 includes a common electrode 210 disposed on a second base substrate 201. The common electrode 210 may be on an entire of the second base substrate 201 without an additional patterning process.

The liquid crystal layer 300 is disposed between the first and second substrates 100 and 200. The liquid crystal layer 300 includes a liquid crystal molecule having a positive dielectric constant anisotropy, so that a relatively longer axis of the liquid crystal molecule may be aligned substantially perpendicular to surfaces of the first and second substrates 100 and 200 when an electric field is not applied between the first and second substrates 100 and 200.

The display apparatus according to the illustrated example embodiment may include a first alignment layer AL1 and a second alignment layer AL2 disposed on the first and second substrates 100 and 200, respectively.

Figure 3:
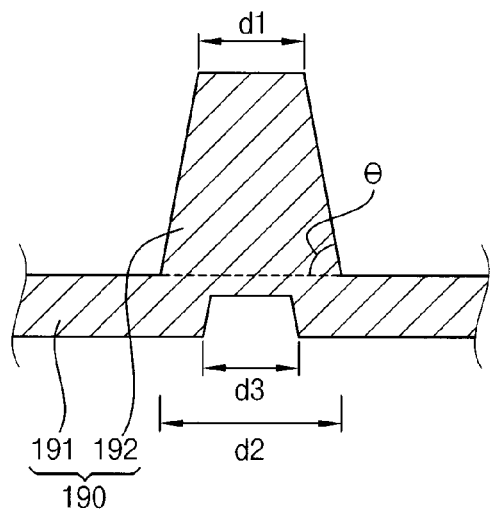
FIG. 3 is an enlarged cross-sectional view illustrating an example embodiment of a BCS substrate and a bottom supporting layer in FIG. 2.

FIG. 3 is an enlarged cross-sectional view illustrating a BCS substrate and a bottom supporting layer in FIG. 2.

Referring to FIGS. 2 and 3, the maintaining portion 192 of the BCS 190 may have a trapezoidal cross-sectional shape having an upper width d1, and a bottom width d2 greater than the upper width d1, but the shape of the BCS 190 is not limited thereto. The cross-sectional shape of the maintaining portion 192 has both side surfaces inclined with respect to the base substrate 101 due to a difference between the upper and bottom widths d1 and d2. An angle between the base substrate 101 and the side surface is defined as a taper angle θ, and the gap between the first and second substrates 100 and 200 may be more accurately controlled as the taper angle is larger. In one example embodiment, for example, a clear division between the maintaining portion 192 and the light blocking portion 191 may be more advantageous.

In an example embodiment of forming the BCS 190, a photoresist, which is a photosensitive organic material including a light blocking material, is patterned to form the BCS 190. The photoresist may include a photopolymerization initiator, a polymer, a monomer, and a binder and so on.

In one example embodiment, for example, a sensitive and a stable triazine compound, which generates a radical when the light is provided, may be used as the photopolymerization initiator. After photopolymerization reaction, the monomer is not dissolved by the radical generated from the photopolymerization initiator. The binder maintains the monomer, which is a liquid at normal temperature, as a film shape, so that the monomer may resist a development solution, a pigment may be stably dispersed and the BCS 190 may have better heat, light and chemical resistance.

The BCS 190 having a higher taper angle θ is easily formed, as a ratio of the polymer with respect to the monomer decreases. The maintaining portion 192 of the BCS 190 may be more recessed during a baking process in manufacturing the BCS 190, as the ratio of the polymer with respect to the monomer decreases. Thus, a photo-active sensitizer such as a photoresist initiate ("PI") or a multifunctional monomer, and 1,2-propanediol dimethacrylate ("PDMA") or 1,1,1-trimethylolethane triacrylate ("TMETA"), is added to increase the strength of the BCS 190 so that recessing of the BCS 190 may be reduced or effectively prevented.

Alternatively, according to the illustrated example embodiment, the bottom supporting layer 193 is under the maintaining portion 192, so that adding an additional material is unnecessary to cure the BCS 190. In addition, the BCS 190 includes a relatively smaller ratio of the polymer, and has the relatively larger taper angle. Thus, recessing of the BCS 190 may be reduced or effectively prevented without the additional material. In one example embodiment, for example, in case that the monomer and the polymer are in a ratio of about 1:1, the taper angle may be about 20°, but in case that the monomer and the polymer are in ratio of about 5:4, the taper angle may be about 40°.

A cross-sectional view of the bottom supporting layer 193 may have a trapezoid shape like that of the maintaining portion 192, but the shape of the bottom supporting layer 193 is not limited thereto. In one example embodiment, for example, the cross-sectional view of the bottom supporting layer 193 may have various shapes such as a circle, a quadrangle, a hexagon, and a polygon, and so on. In one example embodiment, for example, when the upper width d1 of the maintaining portion 192 is about 35 micrometers (μm), a largest width d3 of the bottom supporting layer 193 may be between about 10 μm and about 15 μm.

At the same time, in the example embodiment of the method of forming the BCS 190, the bottom supporting layer 193 and the color filter layer 150 are formed via the exposing, developing and baking processes using the color filter layer 150 and the photoresist. Accordingly, the bottom supporting layer 193 includes the substantially same material as the color filter layer 150, and is formed on the same layer on which the color filter layer is formed. In addition, the height of the bottom supporting layer 193 is the substantially same as that of the color filter layer 150.

FIG. 4A to FIG. 4G are cross-sectional views illustrating an example embodiment of a method of manufacturing a first substrate in FIG. 2.

Figure 4A:
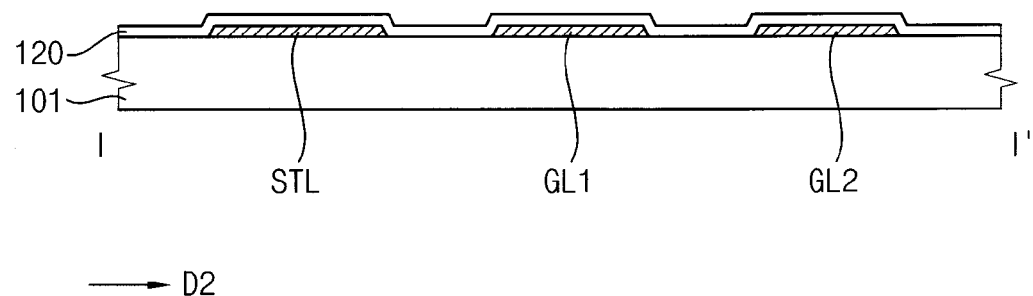
FIG. 4A to FIG. 4G are cross-sectional views illustrating an example embodiment of a method of manufacturing a first substrate in FIG. 2.

Referring to FIGS. 2 and 4A, a gate pattern is formed on the first base substrate 101. In one example embodiment, for example, a gate metal is deposited on the first base substrate 101 having a glass material, via a sputtering method and so on. Then, the first and second gate lines GL1 and GL2, and the first and second electrodes GE1 and GE2 protruded from the first and second gate lines GL1 and GL2, respectively, are formed via photolithography. The storage line STL is formed on the first base substrate 101, and includes the same material as the first and second gate lines GL1 and GL2.

The gate insulating layer 120 is formed on the first base substrate 101 on which the gate pattern is previously formed. The gate insulating layer 120 is formed via a plasma enhanced chemical vapor deposition ("PECVD") method. In one example embodiment, for example, the gate insulating layer 120 is formed to have a thickness of about 3000 angstroms (Å) using silicon nitride (SiNx) or silicon oxide (SiOx).

Figure 4B:
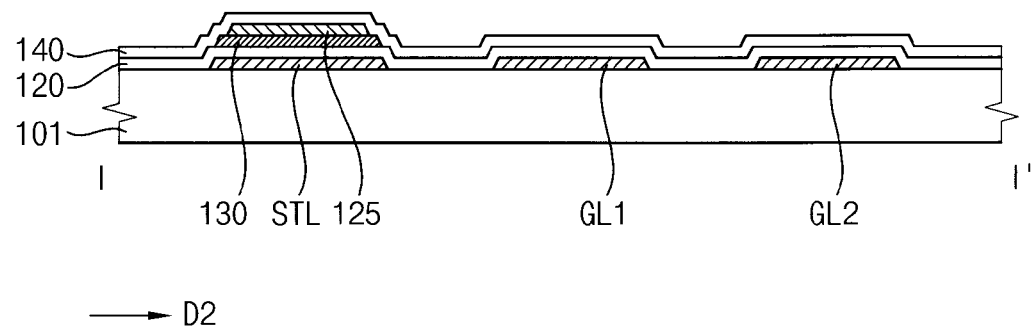

Referring to FIGS. 2 and 4B, the active layer 130 and the first electrode 125 are sequentially formed on the first base substrate 101 on which the gate insulating layer 120 is previously formed. The active layer 130 may be formed as a stacked structure including a semiconductor layer including amorphous silicon (s-Si:H), and an ohmic contact layer including amorphous silicon doped with an ion (n+s-Si:H).

The passivation layer 140 is formed on the first base substrate 101 on which the first electrode 125 is previously formed. The passivation layer 140 is formed via the PECVD method, and for example, the passivation layer 140 may be formed to have a thickness of about 1000 Å using an insulating material, such as silicon nitride (SiNx).

Figure 4C:
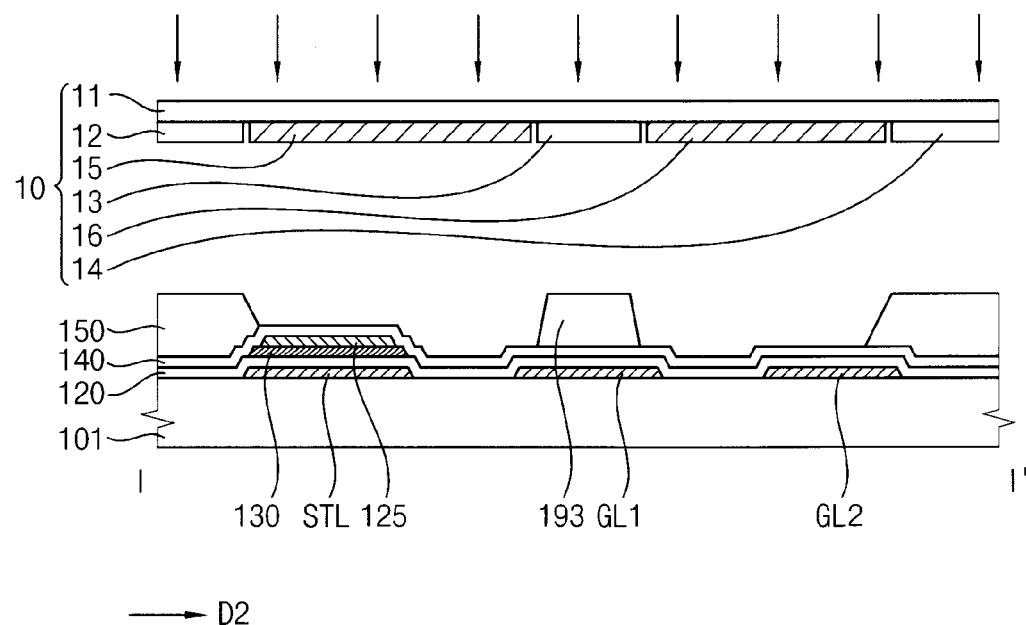

Referring to FIGS. 2 and 4C, the color filter layer 150 and the bottom supporting layer 193 are formed on the first base substrate 101 on which the passivation layer 140 is previously formed. The color filter layer 150 is formed in an area corresponding to a pixel area, and may include the first, second and third filter layers. The first, second and third color filter layers have colors different from each other. The first, second and third color filter layers are sequentially disposed in the pixel area along the first direction D1. The bottom supporting layer 193 is disposed between the first and second color filter layers. The bottom supporting layer 193 includes the same material as the color filter layer 150, and is disposed at a substantially same layer as a layer of the color filter layer 150.

In one example embodiment, for example, a first photo sensitive layer is disposed on the first base substrate 101 on which the passivation layer 140 is previously formed. In one example embodiment, for example, the color filter layer 150 may be formed using a negative photo sensitive layer. When using the negative photo sensitive layer, a portion of the photo sensitive layer exposed to the light is cured to be a net knot structure, and a portion not exposed to the light is removed in a developing process.

Referring to FIG. 4C, areas in which the first and second color filter layers and the bottom supporting layer 193 are formed are exposed to the light (shown by down arrows) using a photo mask 10. The photo mask 10 includes a transparent substrate 11, first, second and third light transmitting portions 12, 13 and 14, a first light blocking portion 15 disposed between the first and second light transmitting portions 12 and 13, and a second light blocking portion 16 disposed between the second and third light transmitting portions 13 and 14.

The transparent substrate 11 includes a transparent material such as quartz, and transmits the light. The first and second light blocking portions 15 and 16 include a metal material such as chrome (Cr). Accordingly, a portion of the first photo sensitive layer corresponding to the first, second and third light transmitting portions 12, 13 and 14, is exposed to the light and is cured, but a portion of the first photo sensitive layer corresponding to the first and second light blocking portions 15 and 16 is not exposed to the light and is not cured. The portion of the first photo sensitive layer corresponding to the first and second light blocking portions 15 and 16 is removed to form a photo sensitive layer pattern via the developing process using an alkali solution such as potassium chloride (KOH).

The portion of the first photo sensitive layer corresponding to the first and third light transmitting portions 12 and 14 are dyed with one of red, green and blue colors R, G and B. The dyed portion of the first photo sensitive layer over the first and second color filter layers and the bottom supporting layer 193 is cured via the baking process with a temperature between about 100 degrees Celsius (° C.) and about 300° C., to form the color filter layer 150 and the bottom supporting layer 193. In one example embodiment, for example, upper portions of the first photo sensitive layer over the first and second color filter layers and the bottom supporting layer 193, are partially melted and removed during the baking process, so that the color filter layer 150 and the bottom supporting layer 193 may be formed to have the trapezoid shape.

According to the illustrated example embodiment, the bottom supporting layer 193 and the color filter layer 150 are formed at the same time, using one photo mask, so that an additional process is unnecessary to form the bottom supporting layer 193. According to the illustrated example embodiment, the color filter layer 150 and the bottom supporting layer 193 are formed by disposing a photo sensitive layer, exposing the photo sensitive layer to the light, dyeing and baking, sequentially. Alternatively, the color filter layer 150 and the bottom supporting layer 193 may be formed via pigment dispersion or electro-deposition.

Figure 4D:
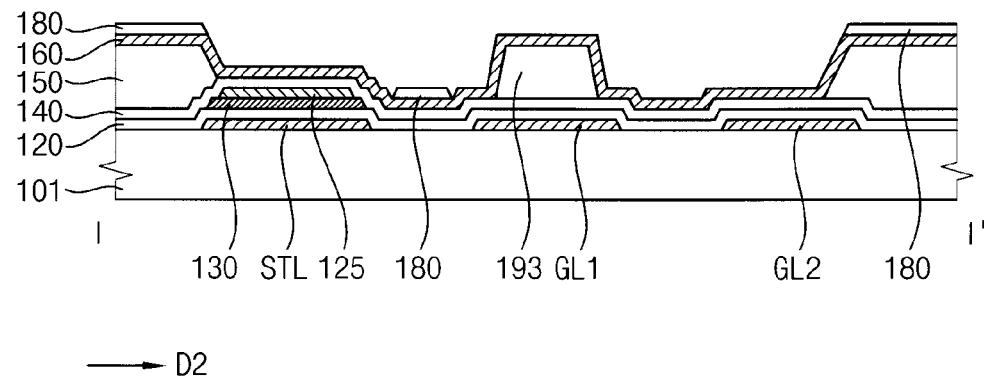

Referring to FIGS. 2 and 4D, the inorganic insulating layer 160 is formed over the color filter layer 150 and bottom supporting layer 193. In one example embodiment, for example, the inorganic insulating layer 160 may include silicon nitride (SiNx). The pixel electrode 180 corresponding to each pixel is formed on the first base substrate 101 on which the inorganic insulating layer 160 is previously formed. In one example embodiment, for example, the pixel electrode 180 may include a transparent conductive material. The pixel electrode 180 is electrically connected to the drain electrodes DE1 and DE2 through the first and second contact hole CNT1 and CNT2, and is electrically connected to the storage line STL through a third contact hole CNT3. An example of the transparent conductive material may include, but is not limited to, indium tin oxide ("ITO") or indium zinc oxide ("IZO").

Figure 4E:
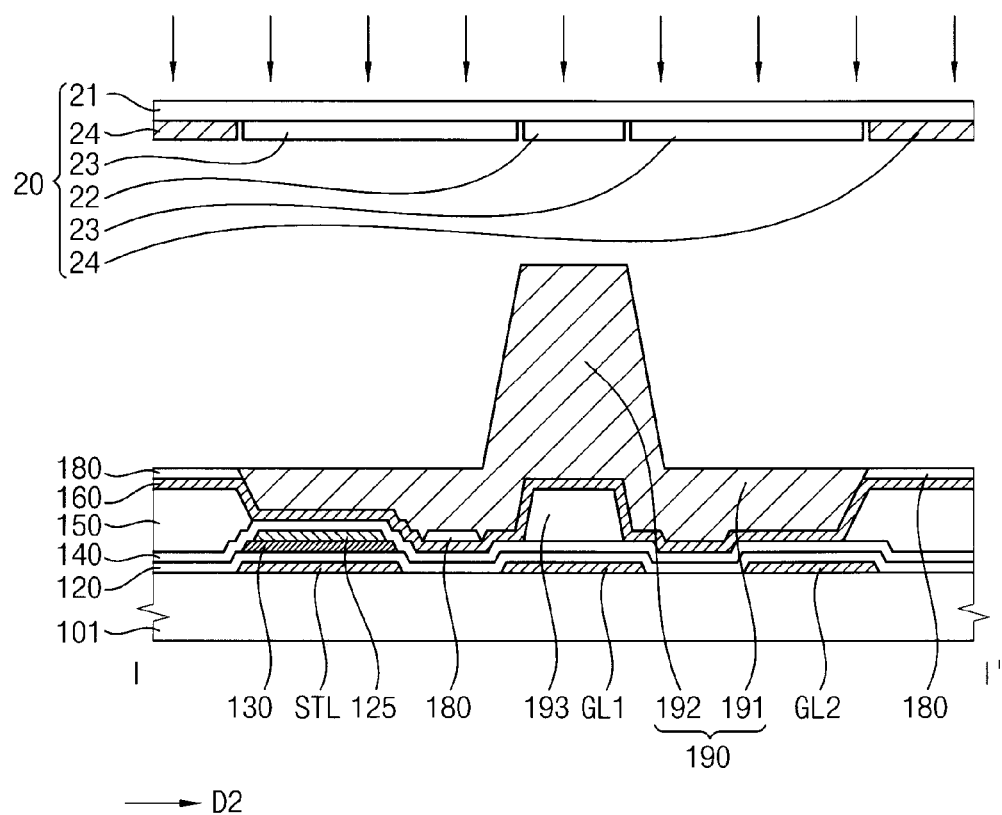

Referring to FIGS. 2 and 4E, the BCS 190 including the light blocking portion 191 and the maintaining portion 192, is formed over the inorganic insulating layer 160, and is disposed between the first and second color filter layers. In one example embodiment, for example, a second photo sensitive layer is disposed over the inorganic insulating layer 160 and between the first and second color filter layer. The second photo sensitive layer may include chrome (Cr) or a black material capable of blocking the light. The BCS 190 is formed using a halftone mask 20 positioned over the second photo sensitive layer.

The halftone mask 20 includes a transparent substrate 21, a first light exposing area 22, and a second light exposing area 23 and a light blocking area 24 which are disposed at both sides of the first light exposing area 22. The transparent substrate 21 includes a transparent material such as quartz, and transmits the light. In one example embodiment, for example, the light blocking area 24 may include a metal material such as chrome (Cr). Intensities of exposing in the first and second light exposing areas 22 and 23 are different from each other. In one example embodiment, for example, an intensity of exposing in the first light exposing area 22 is larger than that in the second light exposing area 23.

Accordingly, the second photo sensitive layer corresponding to the first exposing area 22 is formed as the maintaining portion 192 having a large thickness, and the second photo sensitive layer corresponding to the second exposing area 23 is formed as the light blocking portion 191 having a smaller thickness than that of the maintaining portion 192. Thus, the maintaining portion 192 has a height enough to maintain a gap between the first and second substrates, and an upper surface of the light blocking portion 191 may be substantially coplanar with an upper surface of the stacked pixel electrode 180, the inorganic insulating layer 160 and the color filter layer 150. Alternatively, the height of the light blocking portion 191 is not limited thereto, and may have an upper surface that is lower than an upper surface of the stacked pixel electrode 180, the inorganic insulating layer 160 and the color filter layer 150. When the width of the first light exposing area 22 is about 35 μm, the width of the second light transmitting portion 13 may be between about 10 μm and about 15 μm.

A portion of the second photo sensitive layer not cured via the exposing process is removed via the developing process using an alkali solution, such as potassium chloride (KOH). A portion of the second photo sensitive layer cured via the exposing process becomes the BCS 190 via the baking process. Since an upper portion of the second photo sensitive layer is partially removed during the baking process, the maintaining portion 192 may be formed to have a trapezoid shape.

As mentioned with reference to FIG. 3 to increase the angle between the maintaining portion 192 and the light blocking portion 191 of the BCS 190 is advantageous, and thus to increase the ratio of the monomer with respect to the polymer in the BCS 190 is better. In one embodiment, for example, the polymer and the monomer included in the BCS 190 may be in ratio of about 4:5, and the taper angle which is the angle between the light blocking portion 191 and the maintaining portion 192 may be about 40°. In addition, when the upper width d1 of the maintaining portion 192 is about 35 μm, the longest width d3 of the bottom supporting layer 193 may be between about 10 μm and about 15 μm.

Figure 4F:
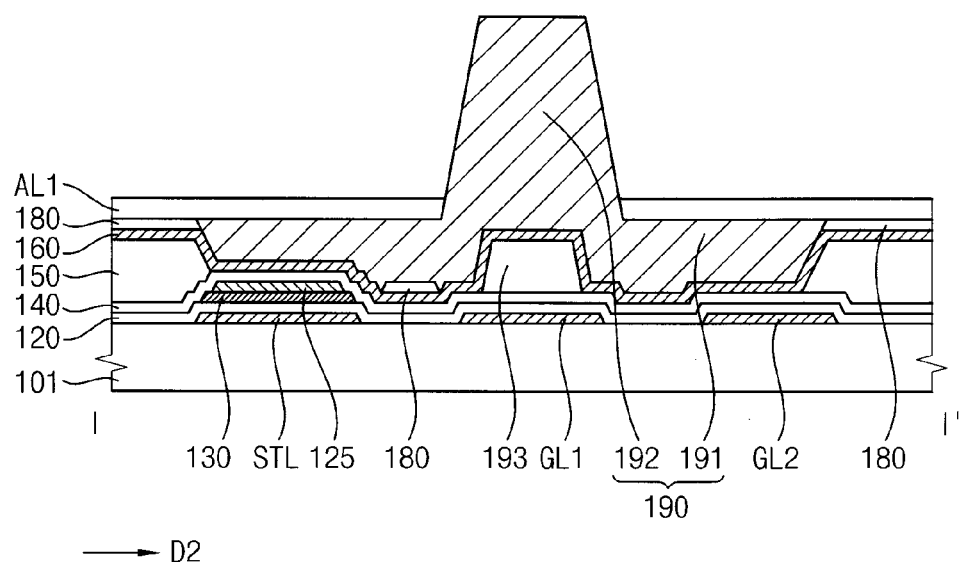

Referring to FIGS. 2 and 4F, a first alignment layer AL1 is disposed on the light blocking portion 191 and the pixel electrode 180. The first alignment layer AL1 aligns a liquid crystal material of the liquid crystal layer 300 in a direction substantially perpendicular to a surface of the first substrate 101. In one example embodiment, for example, the first alignment layer may include a polyimide based compound.

Figure 4G:
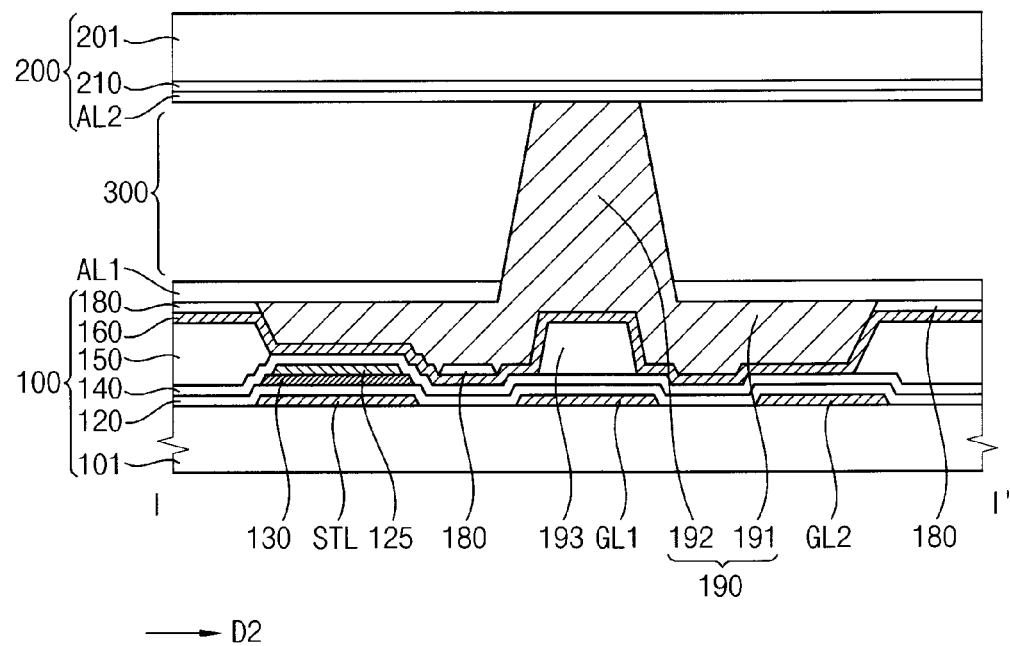

Referring to FIGS. 2 and 4G, the second substrate 200 having the second base substrate 201, the common electrode 210 disposed on the second base substrate 201 and the second alignment layer AL2 disposed on the common electrode 210, is combined with the first substrate 100 such that the first and second substrates 100 and 200 face each other. The second alignment layer AL2 faces the first alignment layer AL1 to align the liquid crystal material in the direction substantially perpendicular to the second alignment layer AL2. The liquid crystal material is disposed between the first and second substrates 100 and 200 to form the liquid crystal layer 300. In one example embodiment, for example, the liquid crystal material is disposed on the first substrate 100, and then the second substrate 200 is combined with the first substrate 100 to form the liquid crystal layer 300.

Figure 5:
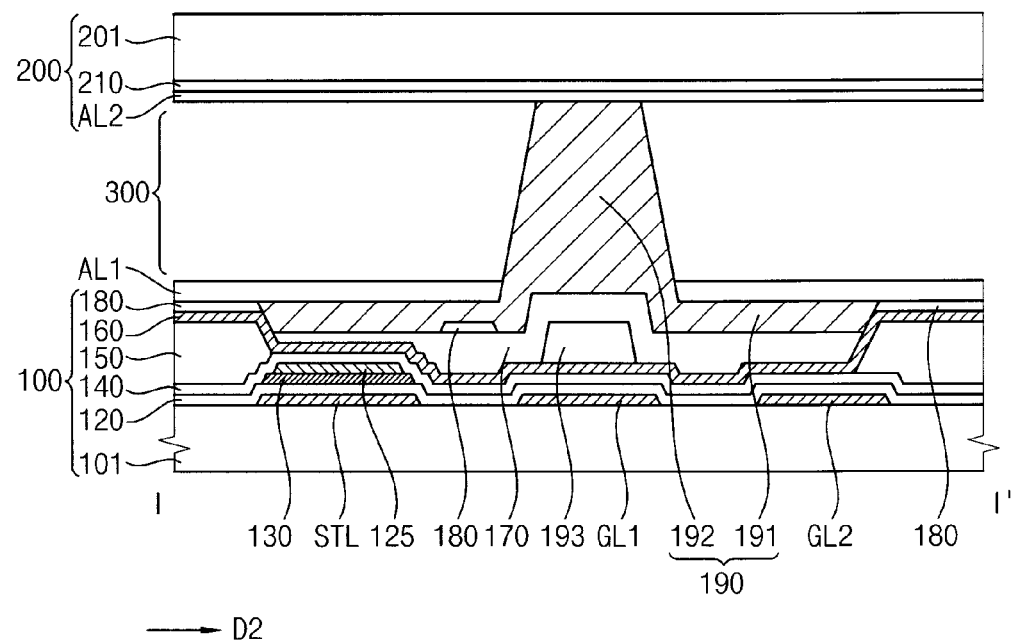
FIG. 5 is a cross-sectional view illustrating another example embodiment of a display apparatus according to the invention.

FIG. 5 is a cross-sectional view illustrating another example embodiment of a display apparatus according to the invention.

Referring to FIG. 5, a display apparatus according to the illustrated example embodiment is substantially same as the display apparatus of FIG. 2 except for an organic insulating layer 170. Accordingly, the same reference numerals will be used to refer to the same or like parts as those described in FIG. 2 and any further repetitive explanation concerning the above elements will be omitted.

An organic insulating layer 170 is disposed on the inorganic layer 160 and the upper portion of the bottom supporting layer 193. In one example embodiment, for example, the organic insulating layer 170 is disposed in the boundary area between first and second sub pixel areas defined by the first and second gate lines GL1 and GL2 and the first and second data lines DL1 and DL2. The inorganic insulating layer 160 and the organic insulating layer 170 may prevent contact between the BCS 190 and the color filter layer 150, and may protect the color filter layer 150 from impurities. In addition, when a thickness the light blocking portion 191 is smaller than the color filter layer 150, a stepped portion due to the light blocking portion 191 formed in the boundary area between the first and second sub pixel areas is decreased, so that the liquid crystal material may be prevented from spreading.

Figure 6A:
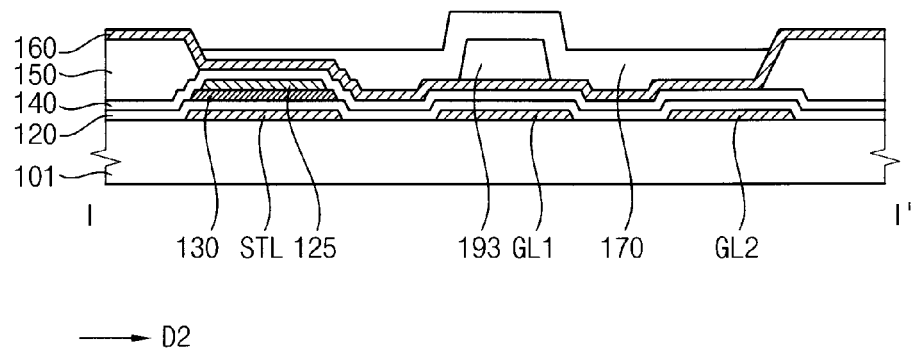
FIG. 6A to FIG. 6B are cross-sectional views illustrating a method of manufacturing a first substrate in FIG. 5.
Figure 6B:
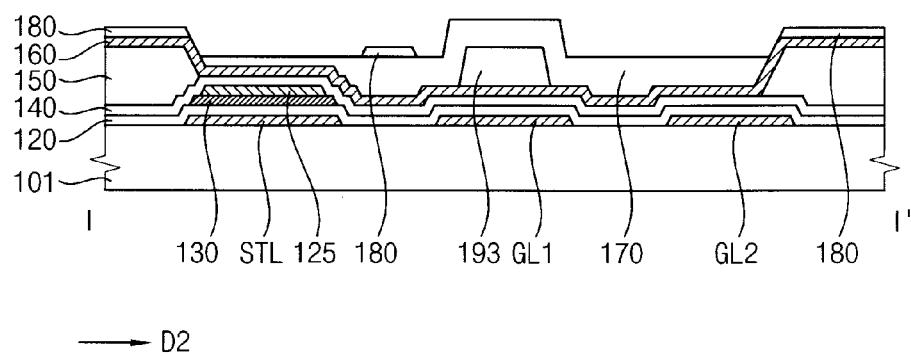

FIG. 6A to FIG. 6B are cross-sectional views illustrating an example embodiment of a method of manufacturing a first substrate in FIG. 5.

The method of manufacturing the display apparatus according to the illustrated example embodiment is substantially same as the method of manufacturing the display apparatus of FIG. 2. Accordingly, the same reference numerals will be used to refer to the same or like parts as those described in FIG. 2 and any further repetitive explanation concerning the above elements will be omitted.

Referring to FIGS. 5, 4A to 4G and 6A, the organic insulating layer 170 is disposed on the inorganic layer 160 and the upper portion of the bottom supporting layer 193. The organic insulating layer 170 includes an insulating material such as silicon nitride (SiNx). The organic insulating layer 170 may protect the color filter layer 150 from impurities. In addition, when the light blocking portion 191 is formed lower than the color filter layer 150, the stepped portion due to the light blocking portion 191 formed in the boundary area between the first and second sub pixel areas is decreased, so that spreading of the liquid crystal material may be reduced or effectively prevented.

Referring to FIGS. 5, 4A to 4G and 6B, the pixel electrode 180 corresponding to each pixel area is disposed on the first base substrate 101 on which the organic insulating layer 170 is previously formed. The first, second and third contact holes CNT1, CNT2 and CNT3 are formed through the organic insulating layer 170. In one example embodiment, for example, the pixel electrode 180 may include a transparent conductive material.

The foregoing is illustrative of the invention and is not to be construed as limiting thereof. Although a few example embodiments of the invention have been described, those skilled in the art will readily appreciate that many modifications are possible in the example embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the specific example embodiments disclosed, and that modifications to the disclosed example embodiments, as well as other example embodiments, are intended to be included within the scope of the appended claims. The invention is defined by the following claims, with equivalents of the claims to be included therein.

What is claimed is:

1. A display substrate comprising:
a base substrate comprising a gate line, a data line crossing the gate line, and a switching element on the base substrate;
color filter layers adjacent to each other on the base substrate;
a bottom supporting layer between the color filter layers adjacent to each other and on the base substrate; and
a light-blocking and maintaining element between the color filter layers adjacent to each other, and on the bottom supporting layer, and comprising a light blocking portion and a maintaining portion, wherein the maintaining portion overlaps the bottom supporting layer and protrudes from the light blocking portion.

2. The display substrate of claim 1, further comprising:
an inorganic insulating layer which overlaps the color filter layers; and
a pixel electrode which overlaps the inorganic insulating layer,
wherein a distance to an upper surface of the light blocking portion from the base substrate is substantially same as a distance to an upper surface of the pixel electrode from the base substrate.

3. The display substrate of claim 1, wherein a width of a cross-section of the maintaining portion taken substantially parallel with the base substrate decreases in a direction away from the base substrate.

4. The display substrate of claim 3, wherein a width of a cross-section of the bottom supporting layer taken substantially parallel with the base substrate decreases in a direction away from the base substrate.

5. The display substrate of claim 4, wherein a minimum width of the cross-section of the maintaining portion taken in a direction substantially parallel with the base substrate, is larger than a maximum width of the cross-section of the bottom supporting layer taken in the direction substantially parallel with the base substrate.

6. The display substrate of claim 5, wherein
the minimum width of the cross-section of the maintaining portion is about 35 micrometers, and
the maximum width of the cross-section of the bottom supporting layer is between about 10 micrometers and about 15 micrometers.

7. The display substrate of claim 3, wherein an angle between a side surface of the maintaining portion and an upper surface of the light blocking portion is about 40°.

8. The display substrate of claim 1, wherein
the color filter layers and the bottom supporting layer are in a same layer, and
the color filter layers and the bottom supporting layer have a substantially same thickness in a direction perpendicular to the base substrate.

9. The display substrate of claim 1, further comprising:
an inorganic insulating layer which overlaps the bottom supporting layer and the color filter layers.

10. The display substrate of claim 9, further comprising:
an organic insulating layer between the inorganic insulating layer and the light-blocking and maintaining element,
wherein an upper surface of the organic insulating layer which overlaps the bottom supporting layer is higher than an upper surface of the organic insulating layer which does not overlap the bottom supporting layer.

* * * * *